(12) United States Patent
Burney et al.

(10) Patent No.: US 10,934,189 B2
(45) Date of Patent: Mar. 2, 2021

(54) METHODS AND COMPOSITIONS FOR CLARIFYING PRODUCED WATERS FOR BOILER FEED WATERS

(71) Applicant: Ecolab USA Inc., St. Paul, MN (US)

(72) Inventors: Jason R. Burney, Aurora, IL (US); Michael J. Murcia, Dekalb, IL (US)

(73) Assignee: Ecolab USA Inc., St. Paul, MN (US)

( * ) Notice: Subject to any disclaimer, the term of this patent is extended or adjusted under 35 U.S.C. 154(b) by 212 days.

(21) Appl. No.: 15/785,947

(22) Filed: Oct. 17, 2017

(65) Prior Publication Data
US 2018/0105442 A1   Apr. 19, 2018

Related U.S. Application Data

(60) Provisional application No. 62/408,893, filed on Oct. 17, 2016.

(51) Int. Cl.

| | |
|---|---|
| *C02F 1/56* | (2006.01) |
| *C08L 33/26* | (2006.01) |
| *C08G 73/02* | (2006.01) |
| *C08L 39/04* | (2006.01) |
| *C02F 5/02* | (2006.01) |
| *C08L 63/00* | (2006.01) |
| *C02F 1/52* | (2006.01) |
| *C02F 1/66* | (2006.01) |
| *C02F 5/06* | (2006.01) |
| *C02F 5/08* | (2006.01) |
| *C02F 9/00* | (2006.01) |
| *C08F 220/56* | (2006.01) |
| *C02F 101/32* | (2006.01) |
| *C02F 103/36* | (2006.01) |

(52) U.S. Cl.
CPC .............. *C02F 1/56* (2013.01); *C02F 1/5245* (2013.01); *C02F 1/5281* (2013.01); *C02F 1/66* (2013.01); *C02F 5/02* (2013.01); *C02F 5/06* (2013.01); *C02F 5/08* (2013.01); *C02F 9/00* (2013.01); *C08F 220/56* (2013.01); *C08G 73/022* (2013.01); *C08G 73/0206* (2013.01); *C08G 73/0213* (2013.01); *C08G 73/0226* (2013.01); *C08L 33/26* (2013.01); *C08L 39/04* (2013.01); *C08L 63/00* (2013.01); *C02F 2101/32* (2013.01); *C02F 2101/325* (2013.01); *C02F 2103/365* (2013.01); *C02F 2209/02* (2013.01); *C02F 2209/06* (2013.01)

(58) Field of Classification Search
None
See application file for complete search history.

(56) References Cited

U.S. PATENT DOCUMENTS

| | | |
|---|---|---|
| 2,216,844 A | 10/1940 | Walter |
| 3,130,167 A | 4/1964 | Green |
| 4,610,801 A | 9/1986 | Matthews et al. |
| 4,925,530 A | 5/1990 | Sinclair et al. |
| 5,476,522 A | 12/1995 | Kerr et al. |
| 5,573,675 A | 11/1996 | Sommese et al. |
| 5,597,475 A | 1/1997 | Kerr et al. |
| 5,622,647 A | 4/1997 | Kerr et al. |
| 5,624,569 A | 4/1997 | Chung et al. |
| 5,750,034 A | 5/1998 | Wong Shing et al. |
| 6,042,732 A | 3/2000 | Jankowski et al. |
| 6,120,690 A | 9/2000 | Haase |
| 6,485,651 B1 | 11/2002 | Branning |
| 6,723,245 B1 | 4/2004 | Collins et al. |
| 6,926,832 B2 | 8/2005 | Collins et al. |
| 7,520,993 B1 | 4/2009 | Laraway et al. |
| 7,591,309 B2 | 9/2009 | Minnich et al. |
| 7,718,069 B2 | 5/2010 | Laraway et al. |
| 8,349,188 B2 | 1/2013 | Soane et al. |
| 8,557,123 B2 | 10/2013 | Berg et al. |
| 8,715,498 B2 | 5/2014 | Bly, Jr. et al. |
| 8,806,774 B2 | 8/2014 | Lorentz et al. |
| 8,889,008 B2 | 11/2014 | Musale et al. |
| 8,945,394 B2 | 2/2015 | Kincaid et al. |
| 9,067,807 B2 | 6/2015 | Some et al. |

(Continued)

OTHER PUBLICATIONS

Sigma, Specification Sheet for Poly(acrylamide-co-diallyldimethylammonium chloride) solution, accessed online on Jul. 11, 2019 at https://www.sigmaaldrich.com/catalog/product/aldrich/409081?lang=en&region=US (Year: 2019).*

Al-Mutaz et al., "Silica Removal During Lime Softening in Water Treatment Plant," International Conf. on Water Resources & Arid Environment, 2004, 10 pages.

Method 180.1: Determination of Turbidity by Nephelometry, EPA, United States Environmental Protection Agency, Aug. 1993, 11 pages.

International Search Report for International Application No. PCT/US2017/056959, dated Dec. 20, 2017, 5 pages.

(Continued)

*Primary Examiner* — Clare M Perrin

(74) *Attorney, Agent, or Firm* — Kagan Binder, PLLC

(57) ABSTRACT

Disclosed are methods and compositions for coagulating and clarifying produced waters for use as boiler feed waters, for example for the generation of steam. The methods and compositions are especially useful for treatment of produced waters from steam-injection methods of tertiary oil recovery such as steam-assisted gravitational drainage. Disclosed are compositions comprising a first copolymer having a high molecular weight and bearing a low molar cationic charge and a second copolymer having a lower molecular weight and bearing a high molar cationic charge. The compositions are suitable for addition as coagulants to produced waters that have been treated by warm lime softening. Also disclosed are methods of treating produced waters from steam-injection oil recovery for use as boiler feed waters to generate steam in such steam injection methods.

13 Claims, No Drawings

(56) References Cited

U.S. PATENT DOCUMENTS

| | | | |
|---|---|---|---|
| 2009/0127205 A1* | 5/2009 | Sikes | C02F 1/56 |
| | | | 210/725 |
| 2009/0173692 A1 | 7/2009 | Laraway et al. | |
| 2011/0017677 A1* | 1/2011 | Evans | C02F 1/5236 |
| | | | 210/708 |
| 2014/0151296 A1 | 6/2014 | Moore et al. | |
| 2015/0259231 A1* | 9/2015 | Webber | C02F 1/66 |
| | | | 210/706 |

OTHER PUBLICATIONS

Written Opinion for International Application No. PCT/US2017/056959, dated Dec. 20, 2017, 8 pages.

\* cited by examiner

METHODS AND COMPOSITIONS FOR CLARIFYING PRODUCED WATERS FOR BOILER FEED WATERS

TECHNICAL FIELD

The present invention relates to compositions and methods for clarifying produced waters such as produced waters from steam-assisted gravity drainage oil recovery from tar sands.

BACKGROUND

Oil sands, also known as tar sands or more technically bituminous sands, are a type of unconventional petroleum deposit. Oil sands are either loose sands or partially consolidated sandstone containing a naturally occurring mixture of sand, clay, and water, saturated with a dense and extremely viscous form of petroleum technically referred to as bitumen. Such natural bitumen deposits are found in many countries, and large reserves thereof are located in Canada, Kazakhstan, and Russia.

Oil produced from bitumen sands is often referred to as unconventional oil or crude bitumen, to distinguish it from liquid hydrocarbons produced from traditional oil wells. The crude bitumen contained in the Canadian oil sands is a highly viscous mixture of hydrocarbons heavier than pentanes which, in its natural state, is not usually recoverable at a commercial rate through a well because it is too thick to flow. Crude bitumen is a sticky viscous form of crude oil, so that it will not flow unless heated or diluted with lighter hydrocarbons such as light crude oil or natural-gas condensate. The World Energy Council has defined natural bitumen as "oil having a viscosity greater than 10,000 centipoise under reservoir conditions and an API gravity of less than 10° API".

Much new production of bitumen and/or heavy oil comes from Alberta's vast oil sands deposits. Two primary methods of oil sands recovery are strip mining and steam-injection methods such as steam-assisted gravity drainage (SAGD). Strip mining is generally only suitable for recovery of bitumen from shallow deposits. However, steam-assisted gravity drainage is better suited to the much larger deep deposits that surround shallow deposits. Future growth in production of bitumen from oil sands by steam-injection techniques is predicted.

Enhanced oil recovery of bitumen and/or heavy oil from oil sands in general disadvantageously requires large quantities of water and results in large quantities of produced water. Petroleum from oil sands extracted via surface mining techniques can consume many times more water than conventional oil drilling. Further, sources of water are required for the increasingly important steam-injection production techniques. Enhanced oil recovery from oil sands produces a great deal of produced water having a high dissolved solids content, for example a very high content of carbonate, bicarbonate, calcium, and/or magnesium ions. The disposal and/or disposition of such produced waters is problematic—typically produced waters contain too much dissolved chemical matter such as various salts for use as agricultural or drinking water. Boilers can heat the produced water to produce steam for use in steam-injection enhanced oil recovery operations. However, to prevent fouling of the boilers, the produced water must be purified and/or treated to remove dissolved solids and/or water hardness. Such treatments include precipitation softening techniques, in which one or more of magnesium oxide, lime, and soda ash are added to water. The magnesium oxide, lime, soda ash, or any combination thereof react with hardness and/or alkalinity in the water to form insoluble compounds, which need to be removed from the water by sedimentation and/or filtration.

Steam-assisted gravity drainage is an enhanced oil recovery technology for producing heavy crude oil and/or bitumen from oil sands. The steam-assisted gravity drainage process is commonly used in oil sands deposits such as those found in central Canada. It is an advanced form of steam stimulation in which a pair of horizontal wells is drilled into an oil reservoir, one a few meters above the other. High pressure steam is continuously injected into the upper wellbore to heat the oil and reduce its viscosity, causing the heated oil to drain under gravity into the lower wellbore. A mixture of oil and a produced water comprising an emulsion is pumped out from the lower wellbore. The liquid mixture can consist of roughly 75% water and 25% heavy oil. The emulsion is separated into a heavy crude oil and a produced water. The oil is transported off-site for refining. Steam-assisted gravity drainage consumes large quantities of water, and it is highly desirable to reuse water generated by the process rather than consume large quantities of fresh water, therefore typically the produced water is returned to the process for reuse. This is advantageous for at least two reasons: Using produced water to provide steam for SAGD reduces usage of fresh water valuable as drinking water, irrigation water, and the like; and reduces the quantity of produced water requiring disposal—disposal of produced water is problematic due to large amounts of dissolved solutes therein. Because of the large volume of steam required to run a SAGD process, it is desirable economically and environmentally to recycle as much water as possible. Ground water is a typical source for additional makeup water. All water must go through additional purification before it can be turned back into steam. Produced waters can contain dissolved silica as well as residual hydrocarbons and dissolved salts comprising for example calcium ions, bicarbonate ions, and magnesium ions. The makeup water will also contain dissolved salts such as calcium salts. At the high temperatures and pressures in boilers and associated plumbing, these salts can form hard scale build-up on the inside of the boiler tubes. The scale reduces thermal efficiency and thus increases the fuel expenditure to generate steam. Furthermore, over time the scale can cause plugging and eventual failure of the boiler and/or plumbing in fluid communication therewith. The total hardness of the water must be reduced. Traditional water treatment in steam-assisted gravity drainage applications uses warm lime softening (WLS). This is a chemical precipitation process. Hydrated lime, aqueous $Ca(OH)_2$, is added to the produced water, which removes various limescale-producing dissolved salts and/or ions from the produced water as insoluble carbonates and hydroxides.

Warm lime softening typically operates in a temperature range of about 49° C. to about 80° C. $Ca(OH)_2$ (hydrated lime), $Na_2CO_3$ (soda ash), MgO (magnesium oxide), or any combination thereof is added to water at from about 49° C. to about 80° C. The technique is effective for precipitation of calcium, magnesium, and silica, the solubilities of which are reduced at increased temperature. However, in order to effectively remove the precipitates from warm lime softening, coagulants are required. The precipitates resulting from precipitation techniques such as warm lime softening may be suspended in the produced water as colloids which do not settle or require inconveniently and/or extremely long time periods to settle. Such colloids can also be extremely difficult to filter due to the fine particle size in colloidal suspensions, and therefore their separation from treated water may be very difficult to effect. The result of lime softening can therefore be colloidal suspensions of high turbidity.

Accordingly, there is a need for coagulants and methods for reducing turbidity of lime-softened water, such as produced water treated by lime softening and lime-softened water produced in enhanced oil recovery of oil sands. It would be particularly advantageous if such coagulants and methods were effective to treat produced waters such that the produced waters thus treated could be used as boiler feed waters, such as boiler feed waters used for generation of steam for steam-injection methods of oil recovery from tar sands.

SUMMARY

Disclosed herein are compositions and methods for treating and reducing the turbidity of lime-softened water, such as produced waters from steam-assisted gravity drainage (SAGD) that have been treated by warm lime softening, Disclosed herein are methods comprising: combining a water source with a first softening agent selected from calcium hydroxide, calcium oxide, sodium carbonate, potassium carbonate, magnesium oxide, magnesium hydroxide, or any combination thereof to make a softened water having a temperature of from about 45° C. to about 80° C. and a pH of about 9.5 to about 11; and combining the softened water with a DADMAC/acrylamide copolymer and an epichlorohydrin/dimethylamine copolymer to make a coagulated water. In embodiments, the softening agent is selected from calcium hydroxide, calcium oxide, sodium carbonate, potassium carbonate, or any combination thereof. In embodiments, the softening agent comprises, consists of, or consists essentially of calcium hydroxide.

In embodiments, the water source comprises, consists of, or consists essentially of a produced water, groundwater, industrial waste water, or any combination thereof. In embodiments the water source comprises a produced water and a make-up water. In embodiments, the make-up water comprises, consists of, or consists essentially of groundwater, industrial waste water, or any combination thereof. In embodiments, the water source consists of or consists essentially of a produced water. In embodiments, the produced water is a water produced by steam-assisted gravity drainage (SAGD).

Disclosed herein are methods comprising: combining a water source with a first softening agent selected from calcium hydroxide, calcium oxide, sodium carbonate, potassium carbonate, magnesium oxide, magnesium hydroxide, or any combination thereof to make a softened water having a temperature of from about 45° C. to about 80° C. and a pH of about 9.5 to about 11; and combining the softened water with a coagulant blend to make a coagulated water, the coagulant blend comprising a DADMAC/acrylamide copolymer and an epichlorohydrin/dimethylamine copolymer. In embodiments, the coagulant blend comprises, consists of, or consists essentially of a DADMAC/acrylamide copolymer, an epichlorohydrin/dimethylamine copolymer, ammonium sulfate, and water. In embodiments, the coagulant blend consists of or consists essentially of a DADMAC/acrylamide copolymer, an epichlorohydrin/dimethylamine copolymer, and water.

In embodiments, the DADMAC/acrylamide copolymer of the methods disclosed herein has a number average molecular weight of about 1,000,000 daltons to about 10,000,000 daltons and a cationic mole charge of about 30% to about 10%, and the epichlorohydrin/dimethylamine copolymer has a number average molecular weight of about 10,000 daltons to about 25,000 daltons. In embodiments, the epichlorohydrin/dimethylamine copolymer has a cationic mole charge of about 40% to about 100%.

In embodiments, the water source comprises a produced water, groundwater, industrial waste water, or any combination thereof. In embodiments the water source comprises a produced water and a make-up water. In embodiments, the water source consists of or consists essentially of a produced water. In embodiments, the produced water is a water produced by steam-assisted gravity drainage (SAGD).

Compositions disclosed herein can be used in the coagulation of water softened by warm lime softening in preparation for steam generation therefrom. In an aspect, the compositions comprise a softened produced water, a DADMAC/acrylamide copolymer, and an epichlorohydrin/dimethylamine copolymer. In embodiments, the number average molecular weight of the DADMAC/acrylamide copolymer is from about 1,000,000 daltons to about 10,000,000 daltons and the number average molecular weight of the epichlorohydrin/dimethylamine copolymer is from about 10,000 daltons to about 25,000 daltons. In some such embodiments, the cationic mole charge of the DADMAC/acrylamide copolymer is between 30% and 10%.

In another aspect, the compositions comprise a first water-soluble or water-dispersible polymer having a number average molecular weight from about 1,000,000 daltons to about 10,000,000 daltons and a cationic mole charge of about 30 mole percent to about 10 mole percent, and a second water-soluble or water-dispersible polymer having a number average molecular weight from about 10,000 daltons to about 25,000 daltons and a cationic charge of about 40 mole percent to about 100 mole percent.

DETAILED DESCRIPTION

Although the present disclosure provides references to preferred embodiments, persons skilled in the art will recognize that changes may be made in form and detail without departing from the spirit and scope of the invention. Reference to various embodiments does not limit the scope of the claims attached hereto. Additionally, any examples set forth in this specification are not intended to be limiting and merely set forth some of the many possible embodiments for the appended claims.

Definitions

Unless otherwise defined, all technical and scientific terms used herein have the same meaning as commonly understood by one of ordinary skill in the art. In case of conflict, the present document, including definitions, will control.

As used herein, the term "produced water" means any water obtained as a byproduct in any crude oil recovery process. In some embodiments, produced water comprises connate and/or injected water.

As used herein, the term "crude oil" includes crude oil irrespective of viscosity, and includes heavy crude oils and bitumens.

As used herein, the term "heavy oil" or "heavy crude oil" means any crude petroleum with an API gravity less than 20°. As used herein, heavy oil includes bitumen.

As used herein, "bitumen" means any heavy oil with a viscosity of 10,000 cP or greater at 20° C.

As used herein, the terms "tertiary oil recovery" and "enhanced oil recovery" are synonymous.

As used herein, "medium" means a material that is liquid at 20° C. and 1 atmosphere pressure. In any of the embodiments herein, the medium can comprise, consist of, or consist essentially of water.

As used herein, the term "natant water" means a continuous phase comprising, consisting of, or consisting essentially of water and having dispersed therein a discontinuous phase comprising, consisting of, or consisting essentially of a suspension.

As used herein, "DADMAC" means diallyldimethylammonium chloride.

As used herein, "softened water" means a water to which a softening agent composition comprising a softening agent has been applied. In embodiments, the softened water comprises a colloidal precipitate of calcium carbonate, magnesium hydroxide, or a combination thereof.

As used herein, "particulate" or "particulate material" means a plurality of particles. As used herein, "particle" means a discreet, solid object to which can be ascribed physicochemical properties such as volume or mass, wherein a particle has a largest maximum dimension in any direction of about 0.001 µm to about 5 mm.

As used herein, "colloid" means a plurality of particles having an average particle size as measured by dynamic light scattering of 1 nm to 1 µm. The plurality of particles is dispersed and suspended in a medium. As used herein, "colloidal suspension" means a liquid comprising a medium and a colloid dispersed and suspended therein.

As used herein, "colloidal precipitate" refers to a precipitate in which part or all of the precipitate is a colloid dispersed in a medium such as water.

As used herein, the term "residual hydrocarbon" means hydrocarbon liquids or solids entrained in produced water after bulk separation of the aqueous and hydrocarbon phases recovered in one or more subterranean hydrocarbon recovery processes. Such processes include but are not limited to hydraulic fracturing and tertiary oil recovery. As used in this context, the term "bulk separation" means sufficient separation to result in a produced water having less than 5% by weight of hydrocarbon entrained therein. As used in this context, the term "entrained" means dispersed, emulsified, or dissolved, or combinations thereof.

As used herein, "connate" is native water present in a subterranean formation along with hydrocarbon.

As used herein, the terms "comprise(s)," "include(s)," "having," "has," "can," "contain(s)," and variants thereof are intended to be open-ended transitional phrases, terms, or words that do not preclude the possibility of additional acts or structures. The singular forms "a," "and" and "the" include plural references unless the context clearly dictates otherwise. The present disclosure also contemplates other embodiments "comprising," "consisting of" and "consisting essentially of," the embodiments or elements presented herein, whether explicitly set forth or not.

As used herein, the term "optional" or "optionally" means that the subsequently described event or circumstance may but need not occur, and that the description includes instances where the event or circumstance occurs and instances in which it does not.

As used herein, the term "about" modifying, for example, the quantity of an ingredient in a composition, concentration, volume, process temperature, process time, yield, flow rate, pressure, and like values, and ranges thereof, employed in describing the embodiments of the disclosure, refers to variation in the numerical quantity that can occur, for example, through typical measuring and handling procedures used for making compounds, compositions, concentrates or use formulations; through inadvertent error in these procedures; through differences in the manufacture, source, or purity of starting materials or ingredients used to carry out the methods, and like proximate considerations. The term "about" also encompasses amounts that differ due to aging of a formulation with a particular initial concentration or mixture, and amounts that differ due to mixing or processing a formulation with a particular initial concentration or mixture. Where modified by the term "about" the claims appended hereto include equivalents to these quantities. Further, where "about" is employed to describe a range of values, for example "about 1 to 5" or "about 1 to about 5", the recitation means "1 to 5" and "about 1 to about 5" and "1 to about 5" and "about 1 to 5" unless specifically limited by context.

Preferred methods and materials are described below, although methods and materials similar or equivalent to those described herein can be used in practice or testing of the present invention. All publications, patent applications, patents and other references mentioned herein are incorporated by reference in their entirety. The materials, methods, and examples disclosed herein are illustrative only and not intended to be limiting.

Discussion

Applicants have found that unexpectedly a combination of a low molecular weight polymer bearing a high cationic molecular charge and a high molecular weight polymer bearing a low cationic molecular charge in aqueous solution is a highly effective coagulant for water sources comprising produced water, wherein the water source has been subjected to warm lime softening, in particular such produced water sourced from enhanced heavy oil and bitumen recovery from oil sands. Such water sources, after being lime softened, have a high pH, for example pH in a range of about 9 to about 12. Useful in the invention are combinations of high molecular weight DADMAC/acrylamide copolymers and low molecular weight copolymers of epichlorohydrin and dimethylamine. The addition of a low molecular weight polymer bearing a high cationic molecular charge and a high molecular weight polymer bearing a low cationic molecular charge in aqueous solution to a produced water is a highly effective step in a purification process for the produced water. After coagulation and optional flocculation, separation of a resulting precipitate and/or sludge from the water provides a clarified water useful for a variety of industrial processes, particularly processes local to the enhanced heavy oil and bitumen recovery. For example, the clarified water is useful as boiler-feed water for the generation of steam in-situ for steam-assisted oil recovery processes such as steam-assisted gravity drainage.

First Embodiments

In embodiments, there is provided a method comprising: combining a water source at a temperature of from about 45° C. to about 80° C. with a softening agent composition to make a softened water; and combining the softened water with (i) a first water-soluble or water-dispersible polymer and (ii) a second water-soluble or water-dispersible polymer to make a coagulated water. In embodiments, the water source comprises, consists of, or consists essentially of a produced water. In some such embodiments, the produced water is a water produced by steam-assisted gravity drainage.

In embodiments, the water source comprises calcium ions, magnesium ions, bicarbonate ions, or any combination thereof. In embodiments, the water source comprises, consists of, or consists essentially of a produced water. In embodiments, the produced water comprises calcium ions, magnesium ions, bicarbonate ions, or any combination thereof. In embodiments, the water source comprises, consists of, or consists essentially of a produced water and a make-up water. In embodiments, the produced water, the make-up water, or both the produced water and the make-up water comprise calcium ions, magnesium ions, bicarbonate ions, or any combination thereof.

In embodiments, the softened water comprises a precipitate of calcium carbonate, magnesium hydroxide, or a combination thereof. In embodiments, the softened water comprises a colloidal dispersion of calcium carbonate, a colloidal dispersion of magnesium hydroxide, or a colloidal dispersion of calcium carbonate and magnesium hydroxide. In embodiments, the precipitate comprises, consists of, or consists essentially of colloidal calcium carbonate, colloidal magnesium hydroxide, or a combination thereof. In embodiments, the average particle size of the colloidal calcium carbonate, colloidal magnesium hydroxide, or both the colloidal calcium carbonate and colloidal magnesium hydroxide as measured by dynamic light scattering is about 1 nm to about 1000 nm, in embodiments about 1 nm to about 500 nm, in embodiments, about 1 nm to about 100 nm, in embodiments about 10 nm to about 100 nm, in embodiments about 10 nm to about 500 nm.

In embodiments, the softened water comprises water and a precipitate of calcium carbonate, a precipitate of magnesium hydroxide, or a combination thereof, wherein the precipitate is dispersed in the water and the average particle size of the precipitate as measured by dynamic light scattering or as measured by laser diffraction is about 1 nm to about 1000 nm, in embodiments about 1 nm to about 500 nm, in embodiments, about 1 nm to about 100 nm, in embodiments about 10 nm to about 100 nm, or in embodiments about 10 nm to about 500 nm.

In some embodiments, the method includes diluting a produced water with make-up water to form the water source; in other embodiments, the water source consists of or consists essentially of the produced water. The softened water comprises a precipitate (in a dispersed phase) and a first natant water (in a continuous phase). In embodiments, the precipitate comprises, consists of, or consists essentially of a colloid.

Polymeric coagulants can further the coagulation process by physically interacting with colloidal particles or microflocs. Coagulants bearing a high charge and coagulants having a high molecular weight are expected to be particularly effective. However, we have found that a combination of a high molecular weight cationic polymer (e.g. having a number average molecular weight of 1,000,000 to 10,000,000) having a low cationic mole charge (e.g. 10% to 30%) with a cationic polymer having a low molecular weight (e.g. a number average molecular weight of 10,000 to 25,000) and a high cationic mole charge (e.g. 40% to 100%) is extremely effective at clarifying a produced water that has been subject to a warm-lime softening process and contains a fine precipitate.

In embodiments, the method comprises passing the water source through a warm lime softener, wherein the warm lime softener comprises a lime silo, a sodium carbonate silo, and a caustic storage tank in fluid communication with a lime and soda precipitation softener vessel, which is in fluid communication with a sludge storage tank, wherein contacting the water source with lime and sodium carbonate in the lime and soda precipitation softener vessel produces a particulate suspension that settles to produce a sludge, which may be recycled back to the lime and soda precipitation vessel.

The combining of the softened water with the first and second polymers to form the coagulated water effects coagulation of the precipitate, wherein the particle size of the precipitate is increased to form a coagulate. In embodiments, the average particle size of the coagulate as measured by dynamic light scattering, laser diffraction, or both dynamic light scattering and laser diffraction is from one to ten times the particle size of the colloid, in embodiments from ten times to 100 times, in embodiments from 100 times to 1,000 times the average particle size of the colloid. The coagulated water comprises a second natant water (in a continuous phase) and a coagulate. The coagulate may be suspended in the second natant water as a suspension (in a dispersed phase) and remain as the suspension, or the coagulate may be suspended in the second natant water as a suspension (in a dispersed phase) and then settle under gravity to form a sludge.

In embodiments, the first polymer has a number average molecular weight of from about 500,000 to about 10,000,000 daltons, in embodiments, from about 1,000,000 daltons to about 7,000,000 daltons, in embodiments, from about 2,000,000 daltons to about 6,000,000 daltons, in embodiments from about 2,500,000 daltons to about 4,500,000 daltons, in embodiments about 3,000,000 daltons to about 4,000,000 daltons. In embodiments, the first polymer has a cationic charge of about 50 mole percent to about 1 mole percent, in embodiments about 40 mole percent to about 1 mole percent, in embodiments about 30 mole percent to about 1 mole percent, in embodiments about 20 mole percent to about 1 mole percent, in embodiments about 10 mole percent to about 1 mole percent, in embodiments about 5 mole percent to about 1 mole percent, in embodiments about 40 mole percent to about 5 mole percent, in embodiments about 30 mole percent to about 5 mole percent, in embodiments about 20 mole percent to about 5 mole percent, in embodiments about 10 mole percent to about 5 mole percent, in embodiments about 40 mole percent to about 10 mole percent, in embodiments about 30 mole percent to about 10 mole percent, or in embodiments 20 mole percent to about 10 mole percent. In embodiments, first polymer consists of, or consists essentially of a DADMAC/acrylamide copolymer.

In embodiments, the second polymer has a number average molecular weight of from about 5,000 daltons to about 100,000 daltons, in embodiments from about 7,000 daltons to about 70,000 daltons, in embodiments from about 10,000 daltons to about 50,000 daltons, in embodiments from about 10,000 daltons to about 40,000 daltons, in embodiments from about 10,000 daltons to about 30,000 daltons, in embodiments from about 10,000 daltons to about 25,000 daltons, in embodiments from about 10,000 daltons to about 20,000 daltons, in embodiments from about 15,000 daltons to about 20,000 daltons.

In embodiments, the ratio by weight of the first polymer to the second copolymer is from about 1:10 to 10:1, in embodiments about 1:4 to about 4:1, in embodiments about 1:3 to about 3:1, in embodiments about 1:2 to about 2:1, in embodiments about 1:2 to about 1:1, in embodiments about 1:1.4.

In embodiments, the method comprises combining the softened water and a coagulant blend, the coagulant blend comprising the first polymer and the second polymer. In embodiments, the coagulant blend further comprises water. In embodiments, the coagulant blend comprises, consists of, or consists essentially of the first polymer, the second polymer, ammonium sulfate, and water. In embodiments, the coagulant blend comprises, consists of, or consists essentially of the DADMAC/acrylamide copolymer, the epichlorohydrin/dimethylamine copolymer, water, and ammonium sulfate. In embodiments, the first polymer and the second polymer are dissolved or dispersed in the water in the coagulant blend. In embodiments, the DADMAC/acrylamide copolymer has a number average molecular weight of from about 500,000 to about 10,000,000 daltons, in embodiments, from about 1,000,000 daltons to about 7,000,000 daltons, in embodiments, from about 2,000,000 daltons to about 6,000,000 daltons, in embodiments from about 2,500,000 daltons to about 4,500,000 daltons, in embodiments about 3,000,000 daltons to about 4,000,000 daltons. In embodiments, the DADMAC/acrylamide copolymer has a cationic charge of about 50 mole percent to about 1 mole percent, in embodiments about 40 mole percent to about 1 mole percent, in embodiments about 30 mole percent to about 1 mole percent, in embodiments about 20 mole percent to about 1 mole percent, in embodiments about 10 mole percent to about 1 mole percent, in embodiments about 5 mole percent to about 1 mole percent, in embodiments about 40 mole percent to about 5 mole percent, in embodiments about 30 mole percent to about 5 mole percent, in embodiments about 20 mole percent to about 5 mole percent, in embodiments about 10 mole percent to about 5 mole percent, in embodiments about 40 mole percent to about 10 mole percent, in embodiments about 30 mole percent to about 10 mole percent, or in embodiments 20 mole percent to about 10 mole percent. In embodiments, the epichlorohydrin/dimethylamine copolymer has a number average molecular weight of from about 5,000 daltons to about 100,000 daltons, in embodiments from about 7,000 daltons to about 70,000 daltons, in embodiments from about 10,000 daltons to about 50,000 daltons, in embodiments from about 10,000 daltons to about 40,000 daltons, in embodiments from about 10,000 daltons to about 30,000 daltons, in embodiments from about 10,000 daltons to about 25,000 daltons, in embodiments from about 10,000 daltons to about 20,000 daltons, in embodiments from about 15,000 daltons to about 20,000 daltons. In embodiments, the ratio by weight of the DADMAC/acrylamide copolymer to the epichlorohydrin/dimethylamine copolymer is from about 1:10 to 10:1, in embodiments about 1:4 to about 4:1, in embodiments about 1:3 to about 3:1, in embodiments about 1:2 to about 2:1, in embodiments about 1:2 to about 1:1, in embodiments about 1:1.4.

In embodiments, the coagulant blend further comprises ammonium sulfate. In some such embodiments, the weight ratio of the ammonium sulfate to the DADMAC acrylamide copolymer is from about 1:10 to 10:1, in embodiments about 1:4 to about 4:1, in embodiments about 1:3 to about 3:1, in embodiments about 1:2 to about 2:1, in embodiments about 1:1. In some such embodiments, the concentration of the sulfate in the coagulated water is from about 1 to about 20 ppm by weight, in embodiments from about 3 to about 15 ppm, in embodiments about 5 to about 10 ppm by weight, or in embodiments about 6.2 ppm by weight.

In embodiments wherein the coagulant blend comprises, consists of, or consists essentially of the DADMAC/acrylamide copolymer, the epichlorohydrin/dimethylamine copolymer, and water; the percent solids of the coagulant blend in embodiments is 60% to 1%, in embodiments 50% to 5%, in embodiments 40% to 5%, in embodiments 40% to 10%, in embodiments 40% to 20%, in embodiments about 30%, or in embodiments 30%.

In some embodiments, the combining of the coagulant blend with the softened water to make the coagulated water comprises, consists of, or consists essentially of adding a first coagulant composition comprising, consisting of, or consisting essentially of the DADMAC/acrylamide copolymer to the softened water, then adding a second coagulant composition comprising, consisting of, or consisting essentially of the epichlorohydrin/dimethylamine copolymer to make the coagulated water. In some such embodiments, the first coagulant composition, the second coagulant composition, or the first and second coagulant compositions comprise water.

In other embodiments, the combining of the coagulant blend with the softened water to make a coagulated water comprises, consists of, or consists essentially of adding a second coagulant composition comprising, consisting of, or consisting essentially of the epichlorohydrin/dimethylamine copolymer to the softened water, then adding a first coagulant composition comprising, consisting of, or consisting essentially of the DADMAC/acrylamide copolymer to make the coagulated water. In some such embodiments, the first coagulant composition, the second coagulant composition, or the first and second coagulant compositions comprise water.

In still other embodiments, the combining of the coagulant blend with the softened water to make the coagulated water comprises, consists of, or consists essentially of adding to the softened water a coagulant-blend composition comprising, consisting of, or consisting essentially of the DADMAC/acrylamide copolymer and the epichlorohydrin/dimethylamine copolymer. In some such embodiments, the coagulant-blend composition comprises water. In some such embodiments, the combining comprises, consists of, or consists essentially of mixing the softened water while adding the coagulant-blend composition to the softened water in such an amount of the coagulant-blend composition such that the turbidity of the coagulated water is minimal. The amount of the coagulant-blend composition such that the turbidity of the coagulated water is the minimum is easily determined experimentally by known methods before the method is carried out on a large scale: For example, a method of determining the amount comprises adding to a sample of the warm-lime-softened water stirred using a mixer with a rotating stirrer at 200 revolutions per minute or higher the coagulant-blend composition in a first particular amount to make a sample coagulated water, discontinuing mixing of the sample coagulated water, settling the sample coagulated water for 30 minutes to make a first natant water, removing a portion of the sample first natant water from about 1 cm below the surface thereof using a pipette or syringe, measuring the turbidity of the portion and obtaining a turbidity measurement thereof, and repeating the steps from the adding to the measuring with an incrementally larger particular amount in each repeating until the turbidity measurement in the repeating reaches a minimum and begins to increase. The turbidity of the portion decreases with increasing particular amounts until reaching a minimum and then increases again, and the particular amount yielding the minimum turbidity measurement is about the amount of the coagulant-blend composition such that the turbidity of the coagulated water is the minimum.

In some embodiments, the combining of the coagulant blend with the softened water to make the coagulated water of any of the preceding embodiments further comprises mixing the coagulated water. The mixing can be accomplished using known means such as an impeller blade or high-shear mixers such as a SILVERSON® mixer, WARING® blender and the like.

In embodiments, the combining of the coagulant blend with the softened water to make the coagulated water comprises, consists of, or consists essentially of adding to the softened water from 10 ppm to 1,000 ppm, in embodiments from 50 ppm to 500 ppm, in embodiments, from 50 ppm to 250 ppm, in embodiments from 75 ppm to 500 ppm, in embodiments from 75 ppm to 250 ppm, in embodiments from 100 ppm to 250 ppm, in embodiments from 100 ppm to about 200 ppm, or in embodiments from about 150 ppm to about 200 ppm by weight of the coagulant blend.

In embodiments, the concentration of the DADMAC/acrylamide copolymer in the coagulated water is from about 1 to about 20 ppm by weight, in embodiments from about 3 to about 15 ppm, in embodiments about 5 to about 10 ppm by weight, or in embodiments about 6.3 ppm by weight. In embodiments, the concentration of the epichlorohydrin/dimethylamine copolymer in the coagulated water is from about 1 to about 20 ppm by weight, in embodiments from about 3 to about 15 ppm, in embodiments about 5 to about 10 ppm by weight, or in embodiments about 8.7 ppm by weight.

In some embodiments wherein the coagulant blend comprises ammonium sulfate, the concentration of the ammonium sulfate in the coagulated water is from about 1 to about 20 ppm by weight, in embodiments from about 3 to about 15 ppm, in embodiments about 5 to about 10 ppm by weight, or in embodiments about 6.3 ppm by weight.

In some first embodiments, the combining of the coagulant blend with the softened water to make the coagulated water is effected by adding the coagulant blend to the softened water batch-wise (namely, a quantity of the coagulant blend and/or coagulant-blend composition is combined with a quantity of the softened water in a containment) over a period of about 5 seconds to one hour, in embodiments 30 seconds to 10 minutes, in embodiments 30 seconds to 5 minutes, in embodiments 1 minute to 5 minutes.

In other embodiments, the combining of the coagulant blend with the softened water to make the coagulated water is effected by adding the coagulant blend to the softened water as a liquid stream of the coagulant blend to a liquid stream of the warm-lime-softened water.

In embodiments, the combining of the coagulant blend with the softened water to make the coagulated water is effected by adding the coagulant blend to the softened water and mixing the blend and the softened water at a high shear, for example using a SILVERSON® mixer, WARING® blender and the like. In some such embodiments, the mixing at a high shear comprises, consists of, or consists of mixing at 100 to 1000 revolutions of the mixing blade per minute (rpm), in embodiments 150 to 500 rpm, in embodiments 150 to 300 rpm, in embodiments about 200 rpm.

In embodiments, the softening agent composition comprises, consists of, or consists essentially of a first softening agent selected from calcium hydroxide, calcium oxide, sodium carbonate, potassium carbonate, magnesium oxide, magnesium hydroxide, or any combination thereof. In embodiments, the softening agent is selected from calcium hydroxide, calcium oxide, sodium carbonate, potassium carbonate, or any combination thereof. In embodiments, the first softening agent comprises, consists of, or consists essentially of calcium hydroxide. In embodiments, the softening agent composition comprises, consists of, or consists essentially of the first softening agent and water. In embodiments, the softening agent composition further comprises a second softening agent selected from sodium aluminate, sodium hydroxide, potassium aluminate, potassium hydroxide, sodium bicarbonate, potassium bicarbonate, or any combination thereof.

The produced water can be any water byproduct from an oil recovery process. In embodiments, the produced water is a water produced by a process selected from primary oil recovery, secondary oil recovery, or tertiary oil recovery. In embodiments, the produced water is recovered with oil in a steam-injection oil recovery process. In some such embodiments, the produced water is a water produced by steam-assisted gravity drainage. In some embodiments, the produced water is a water produced by hydraulic fracturing.

In embodiments, the softened water has a pH of from about 8 to about 14, in embodiments about 9 to about 12.5, in embodiments about 9.5 to about 11.

In embodiments the softened water comprises, consists of, or consists essentially of a colloidal suspension, the colloidal suspension comprising, consisting of, or consisting essentially of a colloid and a medium, the medium comprising water. In embodiments, the colloid comprises, consists of, or consists essentially of calcium carbonate, magnesium hydroxide, or a combination thereof. The colloid is a plurality of particles: in embodiments each particle of the plurality of particles comprises, consists of, or consists essentially of calcium carbonate, magnesium hydroxide, or a combination thereof; and the average particle size as measured by dynamic light scattering, laser diffraction, or both dynamic light scattering and laser diffraction is 1 nm to 1000 nm, in embodiments 5 nm to 1000 nm, in embodiments 1 nm to 100 nm, in embodiments 5 nm to 100 nm, in embodiments 1 nm to 500 nm, in embodiments 10 nm to 1000 nm, in embodiments 10 nm to 500 nm, or in embodiments 100 nm to 1000 nm. In embodiments, the softened water comprises water and a colloid, the colloid comprising calcium carbonate, magnesium hydroxide, or a combination thereof; wherein the softened water has a turbidity as measured by EPA Method 180.1 of about 50 NTU to about 1000 NTU, in embodiments about 100 NTU to about 1000 NTU, in embodiments about 100 NTU to about 500 NTU, or in embodiments about 100 NTU to about 200 NTU.

In embodiments, the water source comprises 20 parts per million (ppm) by weight to 15000 ppm by weight of $Ca^{2+}$, in embodiments 20 ppm to 10000 ppm, in embodiments 30 ppm to 5000 ppm, in embodiments 30 ppm to 2500 ppm, in embodiments 40 ppm to 1000 ppm, in embodiments 40 ppm to 500 ppm, in embodiments, 40 ppm to 100 ppm, in embodiments 30 ppm to 100 ppm, or in embodiments 30 ppm to 80 ppm by weight $Ca^{2+}$.

In embodiments, the water source comprises 20 ppm to 5000 ppm $HCO_3^-$, in embodiments 30 ppm to 1,000 ppm, in embodiments, 40 ppm to 1000 ppm, in embodiments 40 ppm to 750 ppm, in embodiments 40 ppm to 600 ppm, in embodiments 40 ppm to 500 ppm, in embodiments 100 ppm to 1000 ppm, in embodiments 200 ppm to 750 ppm, in embodiments 300 ppm to 600 ppm, or in embodiments about 400 ppm to about 600 ppm by weight $HCO_3^-$.

In embodiments, the water source comprises 10 ppm to 2500 ppm by weight of $Mg^{2+}$, in embodiments 10 ppm to 1500 ppm, in embodiments 10 ppm to 1000 ppm, in embodiments 10 ppm to 500 ppm, in embodiments 10 ppm to 100 ppm, or in embodiments 10 ppm to 20 ppm by weight of $Mg^{2+}$.

In embodiments, the water source comprises 1 ppm to 1000 ppm by weight carbon dioxide, in embodiments 1 ppm to 100 ppm by weight, in embodiments 1 ppm to 50 ppm, in embodiments 1 ppm to 20 ppm, or in embodiments 5 ppm to 15 ppm carbon dioxide by weight.

In embodiments, the water source comprises silica. In embodiments, the water source comprises 10 ppm to 1000 ppm by weight of silica, in embodiments 10 ppm to 500 ppm silica, in embodiments 50 ppm silica to 500 ppm silica, or in embodiments 20 ppm by weight silica to 400 ppm by weight silica.

In embodiments, the water source comprises any combination of the aforementioned concentrations of $Ca^{2+}$, $Mg^{2+}$, $HCO_3^-$, and silica.

In embodiments, the softened water comprises 50 parts per million (ppm) by weight to 37500 ppm by weight of calcium carbonate, in embodiments 50 ppm to 25000 ppm, in embodiments 75 ppm to 12500 ppm, in embodiments 75 ppm to 6250 ppm, in embodiments 100 ppm to 2500 ppm, in embodiments 100 ppm to 1250 ppm, in embodiments, 100 ppm to 250 ppm, in embodiments 75 ppm to 250 ppm, or in embodiments 75 ppm to 200 ppm by weight calcium carbonate.

In embodiments, the softened water comprises 10 ppm to 6000 ppm by weight of magnesium hydroxide, in embodiments 10 ppm to 4000 ppm, in embodiments 10 ppm to 2500 ppm, in embodiments 10 ppm to 1200 ppm, in embodiments 15 ppm to 250 ppm, in embodiments 15 ppm to 500 ppm, or in embodiments 20 ppm to 40 ppm magnesium hydroxide.

In embodiments, the softened water comprises any combination of the aforementioned concentrations of calcium carbonate and magnesium hydroxide.

Second Embodiments

In the first embodiments, the produced water is obtained from the oil recovery process prior to the adding the softening agent composition. In second embodiments, the water source comprises, consists of, or consists essentially of the produced water. In embodiments, the method comprises combining the produced water and a make-up water to form the water source. In second embodiments, any one of the methods of the first embodiments further comprises obtaining the produced water from an oil recovery process selected from primary oil recovery, secondary oil recovery, tertiary oil recovery, or any combination thereof. In some such embodiments, the method comprises obtaining the produced water from an oil recovery process selected from water-flooding, hydraulic fracturing, cyclic steam stimulation, and steam flooding, or any combination thereof. In some such embodiments, the method comprises obtaining the produced water from steam-assisted gravity drainage. Steam-assisted gravity drainage is one type of steam flooding oil recovery technique. In embodiments, the produced water is diluted with make-up water before the combining with the softening agent composition to formed the softened water.

Third Embodiments

In third embodiments, any method of the first or second embodiments further comprises combining a flocculating agent with the coagulated water to form a flocculated water. In embodiments, the flocculating agent comprises, consists of, or consists essentially of an anionic polymer. In embodiments, the flocculating agent is selected from oxyalkylated alcohols; polyacrylamide; acrylamide copolymers bearing a negative molecular charge; polysaccharides; poly(methacrylamide); homopolymers and copolymers comprising the residues of monomers selected from N-vinyl pyrrolidone, N-vinyl formamide, N,N dimethylacrylamide, N-vinyl acetamide, N-vinylpyridine, N-vinylimidazole, isopropyl acrylamide, acrylic acid, a salt of acrylic acid, methacrylic acid, a salt of methacrylic acid, ethylene glycol methacrylate, 2-acrylamido-2-methylpropane sulphonic acid (ATBS), a salt of ATBS, dimethylaminoethyl acrylate (ADAME), dimethylaminoethyl methacrylate (MADAME), dimethydiallylammonium chloride (DADMAC), acrylamido propyltrimethyl ammonium chloride (APTAC), methacrylamido propyltrimethyl ammonium chloride (MAPTAC), and any combination of the residues; and any combination thereof. In one embodiment, the flocculating agent comprises, consists of, or consists essentially of an aqueous solution of an anionic polyacrylamide having a number average molecular weight of about 5,000,000 daltons to 100,000,000 daltons, in embodiments 10,000,000 daltons to 50,000,000 daltons, in embodiments 5,000,000 daltons to 25,000,000 daltons, or in embodiments 10,000,000 daltons to 30,000,000 daltons, or in embodiments 5,000,000 daltons to 30,000,000 daltons, or in embodiments 10,000,000 daltons to 25,000,000 daltons.

In embodiments the flocculating agent has an anionic mole charge of 5% to 50%, in embodiments 10% to 40%, or in embodiments 20%-35%. In one such embodiment, the flocculating agent is a copolymer of acrylamide and sodium acrylate. In another embodiment, the flocculating agent comprises, consists of, or consists essentially of polyacrylic acid and/or a salt thereof. It will be appreciated by those skilled in the art that various modifications (e.g., branched or straight chain modifications, charge density, molecular weight, dosage) to the flocculating agent may be contemplated.

In some third embodiments, the combining the flocculating agent with the coagulated water to form the flocculated water is effected batch-wise (namely, a quantity of the flocculating agent or a composition comprising the flocculating agent is combined with a quantity of the coagulated water in a containment). In other third embodiments, the combining the flocculating agent with the coagulated water to form the flocculated water is effected by combining a liquid stream of a flocculating composition comprising the flocculating agent with a liquid stream of the coagulated water.

In some third embodiments, the adding the flocculating agent to the coagulated water to form the flocculated water comprises, consists of, or consists essentially of adding the flocculating agent to the coagulated water while mixing the flocculating agent and the coagulated water. The mixing can be carried out using methods known in the art such as using an impellor blade. In some such embodiments, the mixing is carried out at 5 to 100 revolutions of the mixing blade per minute (rpm), in embodiments 10 to 75 rpm, in embodiments 15 to 60 rpm.

In some third embodiments, after the combining the flocculating agent with the coagulated water to form the flocculated water, the method comprises the step of mixing the flocculated water for 1 minute to 5 hours, in embodiments 1 minute to 2 hours, in embodiments 1 minute to 1 hour, in embodiments 2 minutes to 2 hours, in embodiments 2 minutes to 1 hour, in embodiments 2 minutes to 45 minutes, in embodiments 2 minutes to 30 minutes, in embodiments 2 minutes to 20 minutes, in embodiments 2 minutes to 10 minutes, in embodiments 1 minute 45 minutes, in embodiments 1 minute to 30 minutes, in embodiments 1 minute to 20 minutes, or in embodiments 1 minute to 10 minutes.

In embodiments, the method of the third embodiments further comprises removing at least a portion of the floc from the flocculated water to provide a clarified water. In embodiments, the removing at least a portion of the floc from the flocculated water comprises filtering the flocculated water, settling the flocculated water, decanting the clarified water from the floc after the floc has settled, or any combination thereof.

In embodiments, the method of the third embodiments comprises removing about 10% to about 99% by weight of the floc from the flocculated water, in embodiments about 50% to about 99%, in embodiments about 50% to about 75%, in embodiments about 60% to about 95%, in embodiments about 70% to about 90%, in embodiments about 90% to about 99%, in embodiments 95% to about 99%, or in embodiments 97% to 100% by weight of the floc from the flocculated water to provide the clarified water.

In embodiments, the adding the flocculating agent to the coagulated water and the removing are separated by a second period of time. In embodiments the second period of time is from about one year to about one month, in embodiments from about one month to about one week, from about one week to about one day, from about one day to about one hour, from about 60 minutes to about 30 seconds, in embodiments from about 45 minutes to about 1 minute, in embodiments from about 45 minutes to about 5 minutes, in embodiments from about 30 minutes to about 1 minute, in embodiments from about 30 minutes to about 5 minutes, in embodiments about 15 minutes to about one minute, in embodiments about 15 minutes to about 5 minutes, or in embodiments about 10 minutes.

In embodiments, the clarified water has a turbidity as measured by as measured by EPA Method 180.1 of about 0.0 NTU to about 0.3 NTU, in embodiments 0.0 NTU to about 0.25 NTU, in embodiments 0.0 NTU to about 0.20 NTU, in embodiments 0.05 NTU to about 0.30 NTU, in embodiments 0.05 NTU to about 0.25 NTU, in embodiments about 0.05 NTU to about 0.20 NTU, in embodiments 0.1 NTU to about 0.30 NTU, in embodiments 0.1 NTU to about 0.25 NTU, or in embodiments about 0.1 NTU to about 0.20 NTU.

Fourth Embodiments

In some first and second embodiments of the method, the coagulate settles out under the influence of gravity when the coagulated water is left without mixing to form a sludge and a clarified water. In the third embodiments, the coagulated water requires the addition of a flocculating agent to the coagulated water to make a clarified water. In some such embodiments, the method further comprises adding a flocculating agent to the coagulated water to make a flocculated water. In embodiments, the adding the flocculating agent to make the flocculated water further comprises mixing the water while adding the flocculating agent to the coagulated water. In embodiments comprising adding the flocculating agent to the coagulated water to make the flocculated water, the flocculated water comprises a third natant water and a floc insoluble or substantially insoluble in the third natant water. In embodiments, the insoluble floc settles out under the influence of gravity when the flocculated water is left without mixing.

Therefore, in some fourth embodiments, any method of the first or second embodiments further comprises settling the coagulated water to form a clarified water and a sludge. In embodiments, the method comprises settling the coagulated water for a first period of time after the combining of the coagulant blend with the softened water.

In fourth embodiments, any method of the first or second embodiments further comprises removing at least a portion of the coagulate from the coagulated water to form a clarified water. In embodiments, removing the at least a portion of the coagulate from the coagulated water and combining the coagulant blend with the softened water are separated by a first period of time. In embodiments, the first period of time is from about one year to about one month, in embodiments from about one month to about one week, from about one week to about one day, from about three days to one day, from about one day to about one hour, from about 60 minutes to about 30 seconds, in embodiments from about 45 minutes to about 1 minute, in embodiments from about 45 minutes to about 5 minutes, in embodiments from about 30 minutes to about 1 minute, or in embodiments from about 30 minutes to about 5 minutes.

In embodiments, the removing comprises filtering the coagulated water, decanting the clarified water from the coagulate, or any combination thereof. In embodiments, the method comprises removing about 10% to about 99% by weight of the coagulate from the coagulated water, in embodiments about 50% to about 99%, in embodiments about 50% to about 75%, in embodiments about 60% to about 95%, in embodiments about 70% to about 90%, in embodiments about 90% to about 99%, in embodiments 95% to about 99%, or in embodiments 97% to 100% by weight of the coagulate from the coagulated water to provide the clarified water.

In embodiments, the clarified water has a turbidity as measured by as measured by a EPA Method 180.1 of about 0.0 NTU to about 0.3 NTU, in embodiments 0.0 NTU to about 0.25 NTU, in embodiments 0.0 NTU to about 0.20 NTU, in embodiments 0.05 NTU to about 0.30 NTU, in embodiments 0.05 NTU to about 0.25 NTU, in embodiments about 0.05 NTU to about 0.20 NTU, in embodiments 0.1 NTU to about 0.30 NTU, in embodiments 0.1 NTU to about 0.25 NTU, or in embodiments about 0.1 NTU to about 0.20 NTU.

Fifth Embodiments

In fifth embodiments, any method of the fourth embodiments further comprises purifying the clarified water in a further purification step selected from ion exchange, filtration, reverse osmosis, evaporator crystallizer treatment, electrodialysis, dissolved gas flotation, plate coalescence, or any combination thereof.

Sixth Embodiments

In sixth embodiments, any of the methods of the fourth or fifth embodiments further comprises heating the clarified water in a boiler to produce steam. In embodiments, the steam is used in an oil recovery process selected from cyclic steam stimulation and steam flooding. In some sixth embodiments, any method of the fourth or fifth embodiments further comprises heating the clarified water in a boiler to produce steam and using the steam or a portion thereof. In some sixth embodiments, any method of the fourth or fifth embodiments further comprises heating the clarified water in a boiler to produce steam and using the steam or a portion thereof in a steam-assisted gravity drainage process, for heating, or both. In embodiments, the method of the sixth embodiments comprises piping steam into a subterranean oil reservoir and retrieving a heavy oil therefrom. In embodiments, the method of the sixth embodiments comprises applying the steam to a steam-assisted gravity drainage process to recover heavy crude oil and/or bitumen from oil sands.

Seventh Embodiments

In seventh embodiments of the invention, there is provided a coagulant blend comprising, consisting of, or consisting essentially of a DADMAC/acrylamide copolymer and an epichlorohydrin/dimethylamine copolymer.

In embodiments, the DADMAC/acrylamide copolymer has a number average molecular weight of from about 500,000 to about 10,000,000 daltons, in embodiments, from about 1,000,000 daltons to about 7,000,000 daltons, in embodiments, from about 2,000,000 daltons to about 6,000,000 daltons, in embodiments from about 2,500,000 daltons to about 4,500,000 daltons, in embodiments about 3,000,000 daltons to about 4,000,000 daltons. In embodiments, the DADMAC/acrylamide copolymer has a cationic charge of about 50 mole percent to about 1 mole percent, in embodiments about 40 mole percent to about 1 mole percent, in embodiments about 30 mole percent to about 1 mole percent, in embodiments about 20 mole percent to about 1 mole percent, in embodiments about 10 mole percent to about 1 mole percent, in embodiments about 5 mole percent to about 1 mole percent, in embodiments about 40 mole percent to about 5 mole percent, in embodiments about 30 mole percent to about 5 mole percent, in embodiments about 20 mole percent to about 5 mole percent, in embodiments about 10 mole percent to about 5 mole percent, in embodiments about 40 mole percent to about 10 mole percent, in embodiments about 30 mole percent to about 10 mole percent, or in embodiments 20 mole percent to about 10 mole percent. In embodiments, the epichlorohydrin/dimethylamine copolymer has a number average molecular weight of from about 5,000 daltons to about 100,000 daltons, in embodiments from about 7,000 daltons to about 70,000 daltons, in embodiments from about 10,000 daltons to about 50,000 daltons, in embodiments from about 10,000 daltons to about 40,000 daltons, in embodiments from about 10,000 daltons to about 30,000 daltons, in embodiments from about 10,000 daltons to about 25,000 daltons, in embodiments from about 10,000 daltons to about 20,000 daltons, in embodiments from about 15,000 daltons to about 20,000 daltons. In embodiments, the ratio by weight of the DADMAC/acrylamide copolymer to the epichlorohydrin/dimethylamine copolymer is from about 1:10 to 10:1, in embodiments about 1:4 to about 4:1, in embodiments about 1:3 to about 3:1, in embodiments about 1:2 to about 2:1, in embodiments about 1:2 to about 1:1, in embodiments about 1:1.4.

In some embodiments, the composition of the seventh embodiments further comprises ammonium sulfate. In some such embodiments, the weight ratio of the ammonium sulfate to the DADMAC acrylamide copolymer is from about 1:10 to 10:1, in embodiments about 1:4 to about 4:1, in embodiments about 1:3 to about 3:1, in embodiments about 1:2 to about 2:1, in embodiments about 1:1.

In embodiments, the coagulant blend further comprises water. In some such embodiments, the percent total solids by weight in the coagulant blend in embodiments is 60% to 1%, in embodiments 50% to 5%, in embodiments 40% to 5%, in embodiments 40% to 10%, in embodiments 40% to 20%, in embodiments about 30%, or in embodiments 30%.

In embodiments, there is provided a coagulated water comprising, consisting of, or consisting essentially of any one of the coagulant blends of the seventh embodiments and a softened water. The softened water comprises water and a precipitate comprising calcium carbonate, magnesium hydroxide, calcium hydroxide, or any combination thereof. The precipitate is substantially insoluble in the softened water between 40° C. to about 100° C., in embodiments 49° C. to 80° C. In embodiments, the precipitate is present in the softened water as a suspension, as a sludge, or as a sludge and a suspension. In some embodiments, the suspension comprises, consists of, or consists essentially of a colloidal suspension. In embodiments, the softened water has a pH of from about 8 to about 14, in embodiments about 9 to about 12.5, in embodiments about 9.5 to about 11.

Eighth Embodiments

In eighth embodiments, there is provided a coagulant blend comprising, consisting of, or consisting essentially of a first water-soluble or water-dispersible polymer having a number average molecular weight from about 500,000 daltons to about 10,000,000 daltons and a cationic charge of about 30 mole percent to about 10 mole percent; and a second water-soluble or water-dispersible polymer having a number average molecular weight from about 10,000 daltons to about 50,000 daltons and a cationic charge of about 40 mole percent to about 100 mole percent. In embodiments the first water-soluble or water-dispersible polymer is water-soluble or substantially water-soluble. In embodiments, the first water-soluble or water-dispersible polymer has a number average molecular weight of from about 500,000 to about 10,000,000 daltons, in embodiments, from about 1,000,000 daltons to about 7,000,000 daltons, in embodiments, from about 2,000,000 daltons to about 6,000,000 daltons, in embodiments from about 2,500,000 daltons to about 4,500,000 daltons, in embodiments about 3,000,000 daltons to about 4,000,000 daltons. In embodiments, the first water-soluble or water-dispersible polymer has a cationic charge of about 50 mole percent to about 1 mole percent, in embodiments about 40 mole percent to about 1 mole percent, in embodiments about 30 mole percent to about 1 mole percent, in embodiments about 20 mole percent to about 1 mole percent, in embodiments about 10 mole percent to about 1 mole percent, in embodiments about 5 mole percent to about 1 mole percent, in embodiments about 40 mole percent to about 5 mole percent, in embodiments about 30 mole percent to about 5 mole percent, in embodiments about 20 mole percent to about 5 mole percent, in embodiments about 10 mole percent to about 5 mole percent, in embodiments about 40 mole percent to about 10 mole percent, in embodiments about 30 mole percent to about 10 mole percent, or in embodiments 20 mole percent to about 10 mole percent. In embodiments, the second water-soluble or water-dispersible polymer is water-soluble or substantially water-soluble. In embodiments, the second water-soluble or water-dispersible polymer has a number average molecular weight of from about 5,000 daltons to about 100,000 daltons, in embodiments from about 7,000 daltons to about 70,000 daltons, in embodiments from about 10,000 daltons to about 50,000 daltons, in embodiments from about 10,000 daltons to about 40,000 daltons, in embodiments from about 10,000 daltons to about 30,000 daltons, in embodiments from about 10,000 daltons to about 25,000 daltons, in embodiments from about 10,000 daltons to about 20,000 daltons, in embodiments from about 15,000 daltons to about 20,000 daltons. In embodiments, the ratio by weight of the first water-soluble or water-dispersible polymer to the second water-soluble or water-dispersible polymer is from about 1:10 to 10:1, in embodiments about 1:4 to about 4:1, in embodiments about 1:3 to about 3:1, in embodiments about 1:2 to about 2:1, in embodiments about 1:2 to about 1:1, in embodiments about 1:1.4.

In some eighth embodiments, the coagulant blend further comprises ammonium sulfate. In some such embodiments, the weight ratio of the ammonium sulfate to the first water-soluble or water-dispersible polymer is from about 1:10 to 10:1, in embodiments about 1:4 to about 4:1, in embodiments about 1:3 to about 3:1, in embodiments about 1:2 to about 2:1, or in embodiments about 1:1.

In some embodiments, the coagulant blend further comprises water. In some such embodiments, the concentration of the first polymer in the coagulant blend is from about 1% to about 10% by weight, in embodiments from about 1% to about 7% by weight, in embodiments from about 1% to about 5% by weight, in embodiments from about 2% to about 5%, in embodiments from about 3% to about 5%; and the concentration of the second polymer in the coagulant blend is from about 1% to about 10% by weight, in embodiments from about 1% to about 7% by weight, in embodiments from about 1% to about 5% by weight, in embodiments from about 2% to about 5%, or in embodiments from about 3% to about 5%.

In some eighth embodiments, the first water-soluble or water-dispersible polymer comprises, consists of, or consists essentially of a DADMAC/acrylamide copolymer. In some eighth embodiments, the second water-soluble or water-dispersible polymer comprises, consists of, or consists essentially of an epichlorohydrin/dimethylamine copolymer.

In some eighth embodiments, there is provided a coagulated water comprising, consisting of, or consisting essentially of any of the coagulant blends of the eighth embodiments; and a softened water. In some such embodiments, the concentration of the first polymer in the coagulated water is from about 1 to about 20 ppm by weight, in embodiments from about 3 to about 15 ppm, in embodiments about 5 to about 10 ppm by weight, or in embodiments about 6.3 ppm by weigh; and the concentration of the second polymer in the coagulated water is from about 1 to about 20 ppm by weight, in embodiments from about 3 to about 15 ppm, in embodiments about 5 to about 10 ppm by weight, or in embodiments about 8.7 ppm by weight.

Ninth Embodiments

In ninth embodiments, there is provided a use of any one of the coagulant blends of the first to ninth embodiments to clarify a softened water comprising a colloidal precipitate. In embodiments, there is provided a use of a DAMAC/acrylamide copolymer and an epichlorohydrin/dimethylamine copolymer to clarify a softened water and make a clarified water.

In some such embodiments, the clarified water is used to make steam and use the stem in a steam assisted gravity drainage process to recover oil from an oil well. In embodiments, the DADMAC/acrylamide copolymer has a number average molecular weight of from about 500,000 to about 10,000,000 daltons, in embodiments, from about 1,000,000 daltons to about 7,000,000 daltons, in embodiments, from about 2,000,000 daltons to about 6,000,000 daltons, in embodiments from about 2,500,000 daltons to about 4,500,000 daltons, in embodiments about 3,000,000 daltons to about 4,000,000 daltons. In embodiments, the DADMAC/acrylamide copolymer has a cationic charge of about 50 mole percent to about 1 mole percent, in embodiments about 40 mole percent to about 1 mole percent, in embodiments about 30 mole percent to about 1 mole percent, in embodiments about 20 mole percent to about 1 mole percent, in embodiments about 10 mole percent to about 1 mole percent, in embodiments about 5 mole percent to about 1 mole percent, in embodiments about 40 mole percent to about 5 mole percent, in embodiments about 30 mole percent to about 5 mole percent, in embodiments about 20 mole percent to about 5 mole percent, in embodiments about 10 mole percent to about 5 mole percent, in embodiments about 40 mole percent to about 10 mole percent, in embodiments about 30 mole percent to about 10 mole percent, or in embodiments 20 mole percent to about 10 mole percent. In embodiments, the epichlorohydrin/dimethylamine copolymer has a number average molecular weight of from about 5,000 daltons to about 100,000 daltons, in embodiments from about 7,000 daltons to about 70,000 daltons, in embodiments from about 10,000 daltons to about 50,000 daltons, in embodiments from about 10,000 daltons to about 40,000 daltons, in embodiments from about 10,000 daltons to about 30,000 daltons, in embodiments from about 10,000 daltons to about 25,000 daltons, in embodiments from about 10,000 daltons to about 20,000 daltons, in embodiments from about 15,000 daltons to about 20,000 daltons. In embodiments, the DADMAC/acrylamide copolymer and the epichlorohydrin/dimethylamine copolymer are used in a weight ratio of from about 1:10 to 10:1, in embodiments about 1:4 to about 4:1, in embodiments about 1:3 to about 3:1, in embodiments about 1:2 to about 2:1, in embodiments about 1:2 to about 1:1, or in embodiments about 1:1.4.

Produced Waters

The physical and chemical properties of produced waters vary considerably depending on the geographic location of the field, the geological formation with which the produced water has been in contact for thousands of years, the type of hydrocarbon product being produced, and the nature of the oil recovery process. Produced water properties and volume can even vary throughout the lifetime of a reservoir. If waterflooding operations are conducted, these properties and volumes may vary even more dramatically as additional water is injected into the formation. A produced water can have a very high total dissolved solids. Many produced waters have a high concentration of ions such as $Ca^{2-}$, $Mg^{2+}$, $Na^+$, $Cl^-$, and/or $HCO_3^-$. Further, produced waters can contain corrosive and/or problematic gases such as carbon dioxide and/or hydrogen sulfide. Carbon dioxide can form carbonic acid, carbonate ions, and/or bicarbonate ions in produced water. Bicarbonates in a produced water can produce limescale, particularly when the produced water is heated. It is advantageous to remove calcium bicarbonate and the like from produced water before the produced water is heated, otherwise the produced water can deposit limescale in boilers, pipes, containments, and the like.

All steam-assisted gravity drainage enhanced oil recovery processes start with parallel wells drilled horizontally, one above the other. High pressure steam is injected into the upper well, the steam temperature reduces the viscosity of the trapped hydrocarbons, and a mixture of oil and condensed water flows into the lower well. The liquid mixture can consist of roughly 75% water and 25% heavy oil, at least some of which can comprise an emulsion. The emulsion is pumped to the surface for additional separation. The oil is transported off-site for refining while the produced water is returned to the steam-assisted gravity drainage process for reuse. Because of the large volume of steam required to run a steam-assisted gravity drainage process, it is advantageous economically and environmentally to recycle as much of the produced water as possible. Groundwater is a typical source for additional makeup water. All water must go through additional purification before it can be turned back into steam.

In embodiments, the produced water of any of the first to ninth embodiments contains one or more of: dissolved silica, residual hydrocarbons, calcium ions, magnesium ions, bicarbonate ions, or any mixture thereof. Makeup water can contain dissolved salts such as calcium chloride, calcium bicarbonate, calcium sulfate, magnesium bicarbonate, magnesium chloride, and/or magnesium sulfate. At high temperatures and pressures, these salts and ions can form hard scale build-up on the inside of boiler tubes. The scale reduces thermal efficiency and thus increases fuel expenditure to generate steam. Furthermore, over time the scale will cause plugging and eventual failure. The total hardness of the water must be reduced before heating in a boiler and/or before evaporation or boiling of water from the produced water. Warm lime softening (WLS) is used to remove hardness from produced water. Warm lime softening is a chemical precipitation process, wherein hydrated lime (Ca(OH)$_2$) and optionally sodium carbonate, and/or magnesium oxide is added to a water to reduce hardness therein and produce a softened water. The lime reacts with, for example, bicarbonates in the water: exemplary equations for such reactions are:

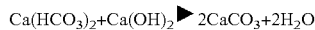

Ca(HCO$_3$)$_2$+Ca(OH)$_2$ ► 2CaCO$_3$+2H$_2$O

Mg(HCO$_3$)$_2$+Ca(OH)$_2$ ► Mg(OH)$_2$+2CaCO$_3$+2H$_2$O

The resulting carbonates such as calcium carbonate are insoluble or substantially insoluble in the produced water and precipitate. Silica is removed by a complex absorption reaction with the Mg(OH)$_2$. Addition of a coagulant and a flocculant to the softened water can assist in the precipitate forming a sludge in the clarifier by coagulating and flocculating the precipitate to produce a natant water and a coagulate and/or floc. In embodiments, the coagulate and/or the floc gravitationally settles forming a sludge. In embodiments, a clarified water is decanted off from the sludge. However, other means of sludge removal from the coagulated or flocculated water may be used in addition or instead of settling. For example, the sludge can be redispersed and filtered from the produced water to yield a clarified water. The sludge must be disposed of.

An example of the ion content of a raw produced water from a SAGD process is given in TABLE 1:

TABLE 1

A produced water from SAGD

| Constituent | Content/ppm |
|---|---|
| Calcium | 70 |
| Magnesium | 16 |
| Sodium | 4142 |
| Potassium | 186 |
| Lithium | 8 |
| Total Cations | 4422 |
| Bicarbonate | 476 |
| Carbonate | 0 |
| Hydroxide | 0 |
| Chloride | 3384 |
| Sulfate | 146 |
| Total Anions | 4006 |
| Carbon dioxide | 10.9 |
| Silica reactive | 330 |
| Dissolved Solids | 5528 |
| Conductivity | 8505 |
| pH | 7.9 |

However, the constituents in produced waters may vary widely. In some embodiments wherein the water source comprises, consists of, or consists essentially of produced water, the produced water comprises 20 parts per million (ppm) by weight to 15000 ppm by weight of Ca$^{2+}$, in embodiments 20 ppm to 10000 ppm, in embodiments 30 ppm to 5000 ppm, in embodiments 30 ppm to 2500 ppm, in embodiments 40 ppm to 1000 ppm, in embodiments 40 ppm to 500 ppm, in embodiments, 40 ppm to 100 ppm, in embodiments 30 ppm to 100 ppm, or in embodiments 30 ppm to 80 ppm by weight Ca$^{2+}$.

In embodiments, the produced water comprises 20 ppm to 5000 ppm HCO$_3^-$, in embodiments 30 ppm to 1,000 ppm, in embodiments, 40 ppm to 1000 ppm, in embodiments 40 ppm to 750 ppm, in embodiments 40 ppm to 600 ppm, in embodiments 40 ppm to 500 ppm, in embodiments 100 ppm to 1000 ppm, in embodiments 200 ppm to 750 ppm, in embodiments 300 ppm to 600 ppm, or in embodiments about 400 ppm to about 600 ppm by weight HCO$_3^-$; or.

In embodiments, the produced water comprises 10 ppm to 2500 ppm by weight of Mg$^{2+}$, in embodiments 10 ppm to 1500 ppm, in embodiments 10 ppm to 1000 ppm, in embodiments 10 ppm to 500 ppm, in embodiments 10 ppm to 100 ppm, or in embodiments 10 ppm to 20 ppm by weight of Mg$^{2+}$.

In embodiments, the produced water comprises 1 ppm to 1000 ppm by weight carbon dioxide, in embodiments 1 ppm to 100 ppm by weight, in embodiments 1 ppm to 50 ppm, in embodiments 1 ppm to 20 ppm, or in embodiments 5 ppm to 15 ppm carbon dioxide by weight.

In embodiments, the produced water comprises silica. In embodiments, the produced water comprises 10 ppm to 1000 ppm by weight of silica, in embodiments 10 ppm to 500 ppm silica, in embodiments 50 ppm silica to 500 ppm silica, or in embodiments 20 ppm by weight silica to 400 ppm by weight silica.

In embodiments, the produced water comprises any combination of one of the aforementioned concentrations of Ca$^{2+}$, one of the aforementioned concentrations of Mg$^{2+}$, one of the aforementioned concentrations of HCO$_3^-$, and any one of the aforementioned concentrations of silica.

EXAMPLES

Example 1

Three coagulant solutions were made up, Solution A (DADMAC/acrylamide copolymer only), Solution B (epichlorohydrin/dimethylamine copolymer only), and Solution C (DADMAC/acrylamide copolymer and epichlorohydrin copolymer as coagulant blend). The compositions of Solutions A, B, and C are given in TABLE 2:

TABLE 2

Coagulant solutions

| | Weight percent of component | | |
|---|---|---|---|
| Component | Solution A | Solution B | Solution C |
| DADMAC/acrylamide copolymer, 30% mole charge, number average molecular weight 3,000,000-4,000,000 daltons | 4.18% | 0% | 3.80% |
| Epichlorohydrin/dimethylamine copolymer, number average molecular weight about 17,000 daltons | 0% | 52.89% | 5.30% |
| Ammonium sulfate | 4.12% | 0% | 3.80% |
| Impurities and/or other components | 1.09% | 0.40% | 0.95% |
| Water | 90.60% | 46.71% | 86.15% |
| All solids | 9.40% | 53.29% | 13.85% |

Example 2

A sample of Produced Water from an SAGD facility was taken. A large beaker was filled to the one-liter mark with the produced water. Stirring of the produced water was begun at about 200 rpm. To the mixing one liter of produced water was added 0.150 g of Solution A followed by a flocculant. The mixing was continued for a further one to five minutes and then the stirrer turned down to a slower speed (15 to 60 rpm). Mixing was continued at the slower speed for about five minutes.

The stirring was discontinued and the coagulated mixture allowed to settle about ten minutes.

The produced water was then sampled with a pipette from about 1 cm below the surface and the turbidity measured using a HACH 2100P Turbidimeter.

Example 3

Example 2 was repeated, except 0.120 g Solution B was used in place of Solution A.

Example 4

Example 2 was repeated, except 0.130 g Solution C was used in place of Solution A.

TABLE 3 shows the turbidity measurements.

TABLE 3

| Example | Solution added to the produced water | Coagulant | Turbidity (NTU) |
| --- | --- | --- | --- |
| Example 2 | Solution A | DADMAC/acrylamide copolymer | 153 |
| Example 3 | Solution B | Epichlorohydrin/dimethylamine copolymer | 0.34 |
| Example 4 | Solution C | DADMAC/acrylamide copolymer and epichlorohydrin/dimethylamine copolymer | 0.17 |

In general, lower turbidities indicate better water clarification of the produced water.

Example 5

A 5% by weight aqueous solution of each of various DADMAC/acrylamide copolymers as shown in TABLE 4 was made up.

TABLE 4

5% Aqueous DADMAC/acrylamide copolymers

| Polymer Solution | DADMAC/acrylamide polymer | |
| --- | --- | --- |
| | Relative specific viscosity | % Mole charge |
| Solution D | 5.30 | 30% |
| Solution E | 4.46 | 30% |
| Solution F | 4.70 | 30% |
| Solution G | 4.00 | 50% |
| Solution H | 2.37 | 80% |
| Solution J | Not measured | 100% |

To each of a series of six beakers was added 20 mL of fluidized sludge settled out of a commercial warm-lime-treated produced water from an SAGD facility. Then to each beaker was added about 180 mL of produced water to make up to the 200 mL-mark. Each 200 mL sludge/produced water mixture was stirred at 300 rpm for ten seconds. Then while stirring, to the contents of each beaker was added one of the solutions D to J of TABLE 4 in the amount indicated in TABLE 5. Each beaker was stirred for two minutes at 300 rpm and then to the contents of each beaker a 0.1% aqueous solution of polyacrylic acid flocculant was added in the amounts shown in TABLE 5. The contents of each beaker were stirred for a further 30 seconds at 300 rpm, then the stirring speed was lowered to 100 rpm and the contents of each beaker stirred for a further five minutes. Then stirring was discontinued and the contents of each beaker were allowed to settle for 15 minutes. The turbidity of each supernatant liquid was measured by the same technique as in Examples 2, 3, and 4: Results are given in TABLE 5.

TABLE 5

Turbidities of sludge/produced water mixtures after addition of various DADMAC/acrylamide coagulants and flocculant

| Jar | 5% Aqueous coagulant solution | Dose of 5% aqueous coagulant/ ppm | Dose of 0.1% flocculant/ ppm | % mole charge of DADMAC/ acrylamide coagulant copolymer | Turbidity (NTU) |
| --- | --- | --- | --- | --- | --- |
| 1 | Solution D | 150 | 2 | 30% | 30 |
| 2 | Solution E | 150 | 2 | 30% | 32 |
| 3 | Solution F | 150 | 2 | 30% | 29 |
| 4 | Solution G | 150 | 2 | 50% | 50 |
| 5 | Solution H | 200 | 2 | 80% | 37 |
| 6 | Solution J | 200 | 2 | 100% | 45 |

In general, lower turbidities indicated improved water clarification. When DADMAC/acrylamide copolymers having mole charges of less than 50% were used to coagulate the sludge/produced water mixtures, this resulted in lower turbidities, and desirably faster settling and lower bed volume of the settled sludge.

What is claimed is:

1. A method of treating a water source, the method comprising:
   (i) combining a water source and a softening agent to make a softened water having a temperature of from about 45° C. to about 80° C. and a pH of about 9.5 to about 11, the softening agent selected from calcium hydroxide, calcium oxide, sodium carbonate, potassium carbonate, or any combination thereof, wherein the softened water comprises a colloidal calcium carbonate, a colloidal magnesium hydroxide, or a combination thereof;
   (ii) coagulating the colloidal calcium carbonate, the colloidal magnesium hydroxide, or the combination thereof, wherein the coagulating consists of combining the softened water with
      (a) a DADMAC/acrylamide copolymer having a number average molecular weight from about 1,000,000 daltons to about 10,000,000 daltons and a cationic mole charge of about 10% to about 30%,
      (b) an epichlorohydrin/dimethylamine copolymer having a number average molecular weight of about 10,000 daltons to about 25,000 daltons, wherein the weight ratio of the DADMAC/acrylamide copolymer to the epichlorohydrin/dimethylamine copolymer is about 1:1.4, (c) optionally water, and
(d) optionally ammonium sulfate to make a coagulated water; and (iii) flocculating the coagulated water, wherein the flocculating consists of combining a one or more flocculating agents and optionally water with the coagulated water to form a flocculated water comprising a floc, wherein the one or more flocculating agents is selected from the group consisting of homopolymers and copolymers comprising the residues of monomers selected from N-vinyl pyrrolidone, N-vinyl formamide, N,N dimethylacrylamide, N-vinyl acetamide, N-vinylpyridine, N-vinylimidazole, isopropyl acrylamide, acrylic acid, a salt of acrylic acid, methacrylic acid, a salt of methacrylic acid, ethylene glycol methacrylate, 2-acrylamido-2-methylpropane sulfonic acid, a salt of 2-acrylamido-2-methylpropane sulfonic acid, dimethylaminoethyl acrylate, dimethylaminoethyl methacrylate, dimethydiallylammonium chloride, acrylamido propyltrimethyl ammonium chloride, methacrylamido propyltrimethyl ammonium chloride, and any combination of the residues, oxyalkylated alcohols, polyacrylamide, acrylamide copolymers bearing a negative molecular charge, polysaccharides, poly(methacrylamide), anionic polymers, and any combination thereof, wherein the water source comprises calcium ions, magnesium ions, bicarbonate ions, or any combination thereof.

2. The method of claim 1, wherein the water source comprises a produced water from a steam-assisted gravity drainage process.

3. The method of claim 1, wherein the one or more flocculating agents is selected from the group consisting of oxyalkylated alcohols, and homopolymers and copolymers comprising the residues of monomers selected from the group consisting of N-vinyl pyrrolidone, N-vinyl formamide, N-vinyl acetamide, acrylic acid, a salt of acrylic acid, methacrylic acid, a salt of methacrylic acid, ethylene glycol methacrylate, 2-acrylamido-2-methylpropane sulfonic acid, a salt of 2-acrylamido-2-methylpropane sulfonic acid, dimethylaminoethyl acrylate, dimethylaminoethyl methacrylate, and any combination of the residues.

4. The method of claim 3, wherein the one or more flocculating agents consists of polyacrylic acid and/or a salt thereof.

5. The method of claim 1, the method further comprises removing at least a portion of the floc from the flocculated water to provide a clarified water.

6. The method of claim 5, further comprising purifying the clarified water in a further purification step selected from ion exchange, filtration, evaporator crystallizer treatment, electrodialysis, dissolved gas flotation, plate coalescence, or any combination thereof.

7. The method of claim 5, further comprising heating the clarified water in a boiler to produce steam.

8. The method of claim 7, further comprising applying the steam to a steam-assisted gravity drainage process to recover heavy crude oil from oil sands.

9. The method of claim 1, wherein the softening agent further comprises sodium aluminate.

10. The method of claim 1, wherein the colloidal calcium carbonate, the colloidal magnesium hydroxide, or the combination thereof has an average particle size as measured by dynamic light scattering of about 1 nm to about 500 nm.

11. The method of claim 10, wherein the coagulate has an average particle size as measured by dynamic light scattering and/or laser diffraction is from 100 times to 1,000 times the average particle size of the colloidal precipitate.

12. A composition consisting of:

(a) a DADMAC/acrylamide copolymer having a number average molecular weight from about 1,000,000 daltons to about 10,000,000 daltons and a cationic charge of about 30 mole percent to about 10 mole percent;

(b) an epichlorohydrin/dimethylamine copolymer having a number average molecular weight from about 10,000 daltons to about 25,000 daltons, wherein the weight ratio of the DADMAC/acrylamide copolymer to the epichlorohydrin/dimethylamine copolymer is about 1:1.4;

(c) water;

(d) optionally ammonium sulfate; and (e) a flocculating agent selected from oxyalkylated alcohols, and homopolymers and copolymers comprising the residues of monomers selected from N-vinyl pyrrolidone, N-vinyl formamide, N-vinyl acetamide, acrylic acid, a salt of acrylic acid, methacrylic acid, a salt of methacrylic acid, ethylene glycol methacrylate, 2-acrylamido-2-methylpropane sulfonic acid, a salt of 2-acrylamido-2-methylpropane sulfonic acid, dimethylaminoethyl acrylate, dimethylaminoethyl methacrylate, and any combination of the residues.

13. The composition of claim 12, wherein the flocculating agent consists of polyacrylic acid and/or a salt thereof.

* * * * *

UNITED STATES PATENT AND TRADEMARK OFFICE
CERTIFICATE OF CORRECTION

PATENT NO. : 10,934,189 B2  
APPLICATION NO. : 15/785947  
DATED : March 2, 2021  
INVENTOR(S) : Jason R. Burney and Michael J. Murcia Page 1 of 1

It is certified that error appears in the above-identified patent and that said Letters Patent is hereby corrected as shown below:

In the Claims

Column 25, Claim 1, Line 22, "dimethydiallylammonium" should be -- dimethyldiallylammonium --

Signed and Sealed this  
First Day of June, 2021

Drew Hirshfeld  
*Performing the Functions and Duties of the*  
*Under Secretary of Commerce for Intellectual Property and*  
*Director of the United States Patent and Trademark Office*